United States Patent Office 3,062,036
Patented Nov. 6, 1962

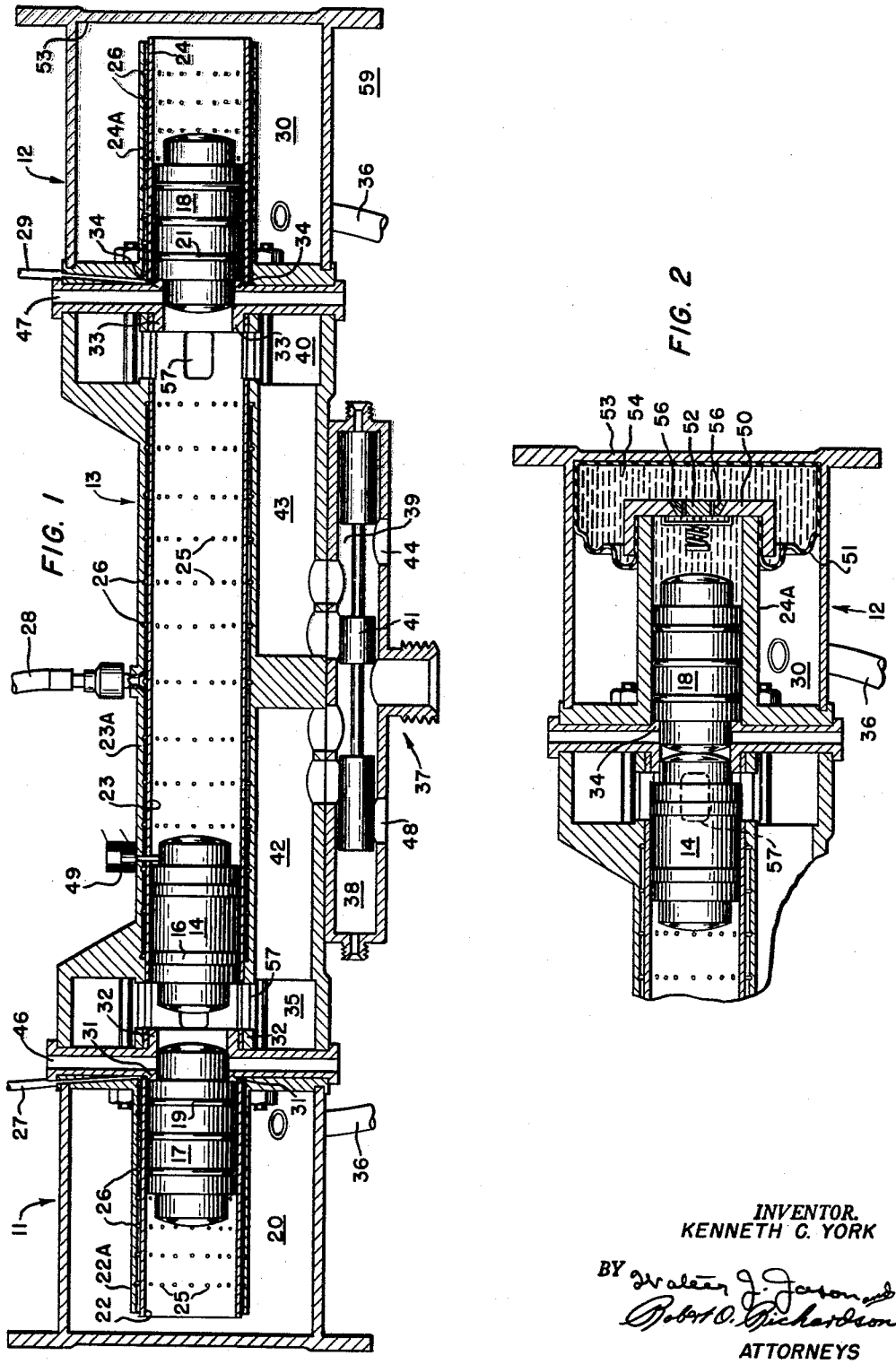

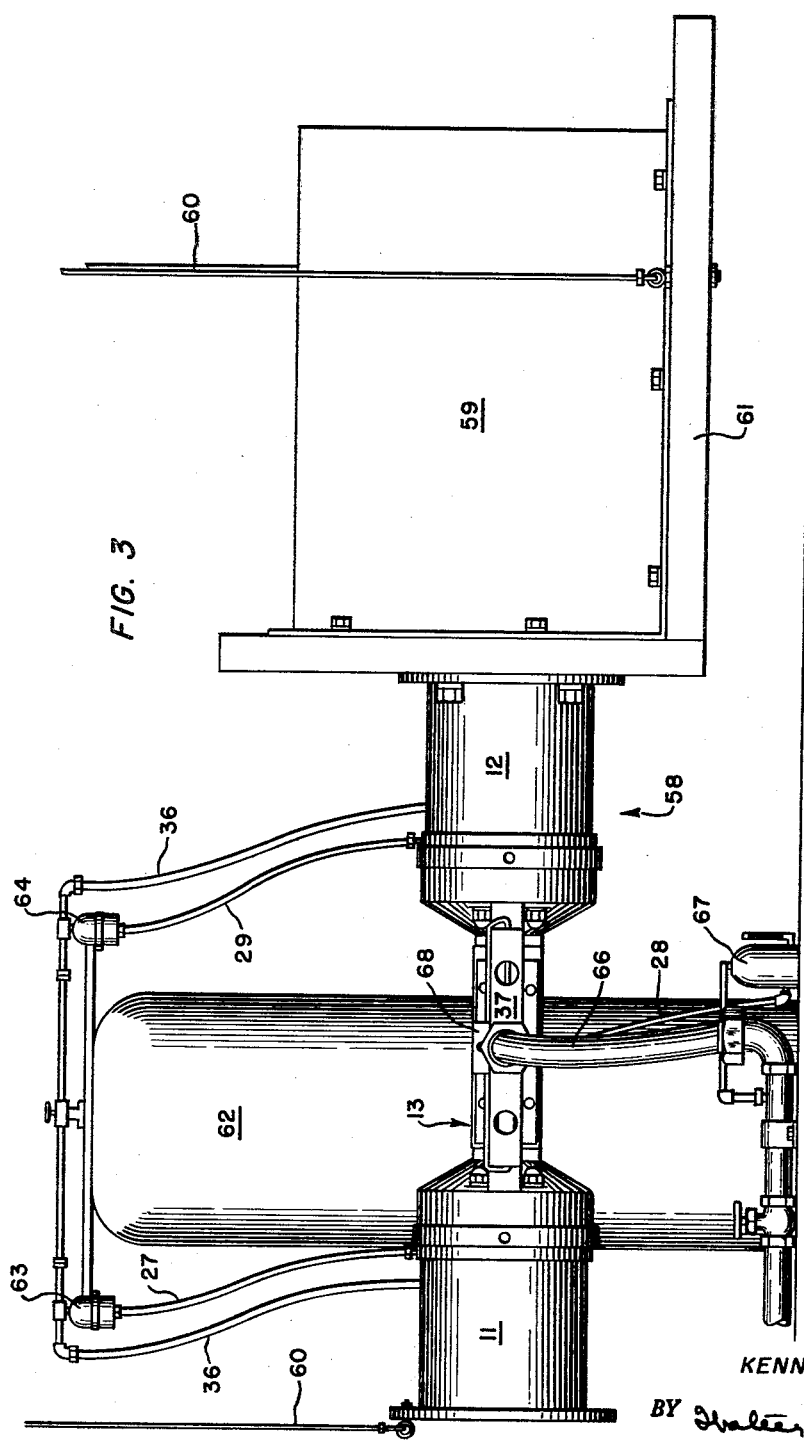

3,062,036
INERTIAL SHOCK TESTER
Kenneth C. York, Pomona, Calif., assignor to General Dynamics Corporation (Convair Division), San Diego, Calif., a corporation of Delaware
Filed Dec. 31, 1959, Ser. No. 863,280
15 Claims. (Cl. 73—12)

This invention relates to inertial shock testing devices for applying a repeated shock as a simulation of random vibration environment or for applying a single sharp shock to simulate an explosion or other environmental condition to electronic or mechanical equipment under test. This device has particular utility as an engineering tool to evaluate new designs or as a production tester for quality assurance.

Guided missile and aircraft vibration is characterized by random amplitude and frequency distributions. This type of vibration simultaneously excites all the various resonances in their equipment. It is the excitation at these resonant frequencies that cause damage, mal-operation and failures. Random vibration is usually simulated by either line spectra sweep frequency testing or by using a random vibration test facility. Line spectra testing is accomplished by mounting the equipment on an electromagnetc shaker and sweeping the vibration frequency through a specified range. This is relatively easy to do but it gives a poor simulation of the actual environment because only one vibration frequency is present at any given time. Also, if the equipment has several modes of operation, the test must be repeated to evaluate each mode of operation. These inadequacies in line spectra testing have led to the development of random vibration test facilities. A typical one consists of an electro-magnetic shaker and a 20 to 100 kilowatt amplifier. An actual flight recorded vibration tape or a white noise signal is fed into the amplifier and the shaker mechanically duplicates the electronic signal. When a dead mass is vibrated, the shaker response to the noise is a faithful reproduction of the vibration desired. However, when equipment with various resonances is vibrated, the shaker output is modified due to the power dissipated in the resonances. To overcome this disadvantage the shaker output must be analyzed during the test and equalizing electronic circuits used to compensate for the effects of equipment resonances. This type of testing can be very difficult and time consuming and requires experienced engineers to conduct the tests.

The repeated shock testing taught by the present invention consists of applying a formed shock pulse repeatedly to the equipment. The shock pulse would be formed to excite the equipment resonances to the maximum amplitudes expected in flight. The shock induces vibration transients with a decay curve depending upon the system damping. The decay curve produces vibration amplitude distributions very similar to the distributions obtained from random vibration. In addition, all resonant frequencies may be excited simultaneously. The repeated shock testing of the present invention is a simple test which can be conducted by technicians instead of engineers. The initial equipment cost is much less. The repeated shock tester can create a controllable environment at frequencies up to 5000 c.p.s. whereas the practical limit of line spectra or random vibration testing is 1,000 c.p.s. Since the tester operates on an inertia principle using compressed air for power, it is not affected by humidity, temperature or altitude. This makes combined environment testing possible, such as by using three units to apply shock in three directions simultaneously or using a unit on a centrifuge to produce a combined vibration and acceleration environment.

A second usage of the present invention is in shock testing in simulating very sharp shocks. A controlled force can be applied to the jig holding the equipment in a fraction of a millisecond to simulate the shock obtained by blasts or impacts. This force can be maintained for several milliseconds. By applying the shock force directly to the jig through the end plate on the tester there is no significant compliance between the point of force application and the jig which would modify the pulse by reducing the shock acceleration build-up time. By operating on the inertia principle the testing unit needs no firm structure against which it must operate.

In the practice of the present invention small weights are accelerated at high "$g$" levels to generate large inertial forces which react against the equipment under test. The unit is basically a free piston motor powered by compressed air which forces a small weight up and down a tube at fairly high velocities. At each end of the tube the weight's momentum is transferred to another weight which is decelerated to zero velocity by a high pressure air cushion, then accelerated in the reverse direction back to almost its original velocity to re-engage the central weight, moving it in the opposite direction. The process is repeated at the other end of the unit to generate a pulse in the opposite direction. Dissipated energy is restored by compressed air fed to the unit through a transfer valve which may be actuated so that a resonant condition may be maintained or so that only a single shock may be produced. The unit is attached to the equipment being tested and both are supported on cables or soft rubber pads which provide no significant restraint against motion. Since the complete assembly has no significant tie to ground the inertial force of the weight reacts against the complete assembly, thereby generating a shock environment in the equipment without damage to the building in which it is housed. For example, a unit generating a million pound shock force could be used on the second story of an office building without damaging effects.

It is therefore an object of this invention to provide for a new and improved inertial shock tester.

Another object is the provision of a shock tester wherein small weights are accelerated at high "$g$" levels to generate large inertial forces.

Another object is the provision of a compressed air driven shock tester for projecting a small weight against the equipment under test.

Another object is the provision of a shock tester with no significant tie to ground so that large shock forces may be applied to the equipment under test without requiring structural reinforcement to the housing supporting it.

Another object is the provision of a compressed air driven shock tester which will accelerate a small weight against the equipment under test under single pulse, random frequency or resonant conditions.

Other objects and features of the present invention will be readily apparent to those skilled in the art from the following specification and appended drawings wherein is illustrated a preferred form of the invention, and in which:

FIGURE 1 is an elevational cross-sectional view of the shock producing unit,

FIGURE 2 is a cross-sectional view of a modification, and

FIGURE 3 shows the unit ready for operation.

Referring now to FIGURE 1 the unit is preferably cylindrical in shape and consists of two identical end sections 11, 12 and a center section 13. Inside each section is a cylindrical weight of identical weight to the others. They are made of heat treated steel or other very hard material. The center weight 14 uses steel piston rings 16 and a high pressure seal is obtained on the end weights 17, 18 by using O rings 19, and 21. The center and end sections have hard steel liners 22, 23, 24 in which the weights are adapted to oscillate. Grooves 26 are cut in the inner surfaces of the outer cases 22A, 23A and 24A for oil circulation between the outer cases and their liners. The liners have a plurality of small oil passing openings 25 therein. Oil is forced through these openings from the grooves 26 under pressure through three flexible lines 27, 28, 29 for lubrication purposes. Suitable stops 31, 32, 33, 34 are provided at each end of the center section 13 and at the inner ends of the end sections 11, 12 to retain the respective weights 14, 17, 18 in their corresponding sections. Each weight is adapted to strike the next weight before reaching its respective stop. The end sections 11, 12 have pressure chambers 20, 30 connected to a high pressure air source by a flexible tubing 36. The compressed air serves to urge both end weights 17, 18 inwardly against their respective stops 31, and 34. Chambers 35, 40 at either end of the center section 13 communicate with casing 23A through openings 57. Transfer valve 37 selects one of these chambers for connection with a pressure source to drive the center weight 14 to the opposite end. The transfer valve 37 is preferably a two-stage unit to obtain an adequate response. The pilot valve, not shown, may be cycled either electrically or mechanically through shock acceleration, pressure build-up in the end chambers or other method to program the shock pattern. The pilot valve supplies pressurized air to one of the end ports 38, 39 of the major valve to move the spool 41 to reverse the air supply to the center section of the unit. As shown, spool 41 is in its extreme right position so that air is directed through the left manifold 42 to chamber 35 at the left of the center weight 14. There is an open air path from the right end of the weight 14, through the right manifold 43 and out the valve orifice 44 so that movement of the weight 14 to the right will not compress air between it and the end weight 18, to lessen the center weight's striking efficiency. When the center weight 14 strikes the end weight 18 the center weight stops dead and transfers its momentum to the end weight. The end weight, having acquired this momentum, moves from the stop 34 to apply a great force through the high pressure medium to the end plate 53 at the other end of the section 12 to the equipment being tested. The end weight 18 is decelerated to zero velocity without striking the end plate 53, then accelerated to almost its original velocity in the reverse direction. In the meantime the center weight 14 has been held against its stop 33 by the low pressure acting on it from the left. (Relief ports 46, 47 prevent air from compressing between the end weights 17, 18 and center weight 14 when the end weights are moving inwardly to contact the center weight.) The right end weight 18 strikes the center weight 14 just before it reaches its stop 34. This contact stops the end weight 18 and transfers its momentum back to the center weight 14. The end weight 18 is again held against its stop 34 by the high pressure air and the center weight 14 moves down the center section 13 to the left. By this time the valve spool 41 will have been moved to the left, for a resonant condition operation, directing air to the right side of the center weight and opening an air path exit to the left side through orifice 48. The same procedure is repeated on the left end of the unit to generate a pulse in the opposite direction.

The unit loses energy during the shock cycle by energy dissipation in the various vibrating modes of the equipment under test. Also, energy is lost through friction. Therefore, some velocity will be lost during each shock cycle and power must be applied to maintain operation. As previously mentioned, this power is obtained from the compressed air fed to the unit through the transfer valve 37. To maintain resonant condition the valve is adjusted to trip immediately following end weight impact on the center weight. Since the power factor of the system is unity, the higher the driving air pressure, the faster the unit operates.

The sharp acceleration build-up in the unit makes it an ideal tester to simulate sharp shocks of the type obtained from blasts. In this simulation a solenoid operated latch 49 is used. When the latch is released, air pressure from the left end of the center section 13 accelerates the weight 14 down the tube to strike the end weight 18 and to generate the shock pulse. A single shock will be produced if the spool 41 is then moved to the left in the same manner as in producing the resonant condition. This provides a free air path to the left of the center section (orifice 48 is now open) to reduce the air pressure, permitting the driving air pressure on its right to move the weight 14 to the left sufficiently to be locked in place by the latch 49.

A dissipating series of shocks is obtained by retaining spool 41 to the right. This keeps the air pressure directed to the left of the center weight 14 to work against its return to the left. With this reduced velocity the center weight will not have sufficient velocity to return to its original latched position. The compressed air to the left decelerates the weight to zero velocity and then accelerates it back down the tube to the right again. This produces a second shock with a shorter duration and of less severity due to the reduced velocity. The process will continue until all the energy in the system is dissipated.

With the exception of operating the tester to produce a dissipating series of shocks, definite phasing of the compressed air by the transfer valve 37 must be maintained during its operation. It is designed for high operating efficiency with a resulting loss in adaptability.

A non-resonant tester, while less efficient, will have greater flexibility. By controlling the action of the transfer valve externally of the tester the wave form of the shock pulse can be modified. Longer time intervals between shock pulses can be obtained. FIGURE 2 shows how the end section 12 of the tester may be modified for non-resonant operation. Here a cover 50 is fitted over the outer end of casing 24A. A flexible fluid tight bladder 51 extends from around the end of the cover 50. A check valve 52 is provided in the cover 50. Shock pressure from the left of the valve causes it to open to the right, permitting the shock from the end weight 18 to be transmitted to the end plate 53 through the hydraulic fluid medium 54. The unit's operation is the same as before except that after the weight is decelerated to the right the compressed air in the end chamber 30 reacts against the hydraulic fluid, closing the check valve 52 and permitting hydraulic fluid to flow back slowly through small orifices 56 in the valve into the end of the casing. This fluid return repositions the weight 18 against its stop 34 to await the next blow from the center weight 14. It should be noted that when end weight 18 is seated against its stop 34 it will also have moved the center weight 14 to the left enough to partially expose opening 57 to the right manifold 43. This permits pressurized air to come through to the right of the center weight 14 to move it to the left for the next cycle.

FIGURE 3 shows the unit 58 ready for testing a piece of equipment 59. Both the unit and the equipment are suspended from cables 60 and are interconnected by a jig fixture 61. A large high pressure air tank 62 is connected through flexible lines 36 to pressurize the chambers of end sections 11 and 12. Two oil accumulators 63, 64 pressurized from the tank 62 provide lubrication oil under high pressure to the end chambers through lines 27. The low pressure air for power is supplied to the unit through line 66. An accumulator 67 charged by compressed air from this line provides oil under pressure for lubrication of the center section 13. The pilot transfer valve 68 is attached to the major transfer valve 37. Means for actuating the pilot valve is not shown, however.

The maximum force output of the tester comprising the present invention is dependent on the cross-sectional area of the weights and the maximum safe operating pressure for the end chamber. With a suggested cross-sectional area of 3 square inches and an assumed maximum operation pressure of 4000 pounds per square inch, the unit maximum force output would be 12,000 pounds. The time duration of the shock pulse is dependent on the mass of the weights and the operating velocity. Impact velocities of 100 feet per second is safe for steel. A unit operating at this velocity using 3 pound weights will produce a 12,000 pound force for a period .0015 second. The maximum stroke of the weight is another important factor. If the weights are operated with a 100 ft./sec. velocity and with a 12 inch travel of the center weight, the shock pulse in plus and minus directions will be separated by .01 sec. The stroke of the end weight limits the minimum force permissible at a given operating velocity. In the preferred embodiment a maximum stroke of 3 inches was established for the end weights. If the unit is operated at 100 ft./sec. at a force output below 2,000 pounds, the end weight will bottom. Hence, if lower force levels are desired, the operating velocity must be reduced to prevent bottoming.

The complete tester weighs approximately 50 lbs. Therefore, the 12,000 maximum force would produce a 240 "g" shock if the unit were operated alone. If attached to a 50 pound test specimen, the "g" shock is cut to 120. If shock levels of higher than 240 "g" is desired in testing small components, a unit operating at very high pressures with a very light weight design would have to be used. Repeated shock levels as high as 1,000 g's can be obtained on vacuum tubes, for example, while a single pulse tester can be designed to produce a "g" force of several thousand.

The preferred embodiment may be modified by using flow restriction and limiting the air volumes in the end chamber to produce the various shock waveforms necessary for specific test conditions. If the test equipment environment called for a single frequency vibration in addition to the random vibration, a single frequency vibration may be superimposed on the shock pulse. One way of accomplishing this would be to mount one or more high "Q" resonant spring mass systems on either the tester or the jig holding the equipment. These resonant systems will be excited by the shock during the tester operation to produce line spectra in the environment.

A still further modification of the tester would be to convert the unit to a free piston engine to obtain power for its operation. A fuel-air mixture would be fired to replace the energy lost in the system during the shock pulse, eliminating the need for pressurized air and a transfer valve. The units would be capable of faster operation than with the compressed air power.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A shock tester comprising two end sections each including a cylindrical open-ended end casing, a center section connected to said end sections and including a cylindrical open-ended center casing, said end casings and center casing being aligned, each of said end casings having an end weight adapted to oscillate therein, said center casing having a center weight adapted to oscillate therein, each of said end sections including an air chamber connected to an air pressure source and communicating with its associated casing to thereby urge the end weight therein to the inward end thereof, stop means for limiting inward movement of said end weights, said center section having air pressure chambers at either end thereof communicating with said center casing, switch means connected to an air pressure source for selectively pressurizing one of said air pressure chambers and depressurizing the other of said air pressure chambers for moving said center weight to the desired end of said center section casing, stop means at both ends of said center casing for limiting outward movement of said center weight, said stop means being positioned so that when said end weights abut their inner stops said center weight will first strike one of said end weights before striking its stop means at that end of its travel.

2. A shock tester comprising two end sections each including a cylindrical open-ended end casing, a center section connected to said end sections and including a cylindrical open-ended center casing, said end casings and center casing being aligned, each of said end casings having an end weight adapted to oscillate therein, said center casing having a center weight adapted to oscillate therein, each of said end sections including an air chamber connected to an air pressure source and communicating with the outer end of its associated end casing to thereby urge the end weight therein to the inward end thereof, stop means for limiting inward movement of said end weights, said center section having air pressure chambers at either end thereof communicating with said center casing, valve means connected to an air pressure source for selectively pressurizing one of said air pressure chambers and depressurizing the other of said air pressure chambers for chambers for moving said center weight to the depressurized end of said center casing, stop means at both ends of said center casing for limiting outward movement of said center weight, said stop means being positioned so that when said end weights abut their inner stops said center weight will first strike said end weight before striking its stop means at that end of its travel, one of said end sections being connected to said equipment, and means for suspending said tester and equipment for movement as a unit.

3. A shock tester comprising two end sections each including a cylindrical open-ended end casing, a center section connected to said end sections and including a cylindrical open-ended center casing, said end casings and center casing being aligned, each of said end casings having an end weight adapted to oscillate therein, said center casing having a center weight adapted to oscillate therein, each of said end sections including an air chamber connected to an air pressure source and communicating with the outer end of its associated end casing to thereby urge the end weight therein to the inward end thereof, stop means for limiting inward movement of said end weights, said center casing having a left air pressure chamber at one end thereof and a right air pressure chamber at the other end thereof, said air pressure chambers communicating with said center casing, left and right manifold portions communicating with said left and right air pressure chambers, respectively, valve means connecting said manifolds to an air pressure source for selectively pressurizing one of said air pressure chambers and depressurizing the other of said air pressure chambers for moving said center weight to the depressurized end of said center casing, stop means at both ends of said center casing for limiting outward movement of said center weight, said stop means being positioned so that when said end weights abut their inner stops said center weight will first strike one of said end weights before striking its stop means at that end of its travel.

4. A shock tester comprising two end sections each including a cylindrical open-ended end casing, a center section connected to said end sections and including a cylindrical open-ended center casing, said end casings and center casing being aligned, each of said end casings having an end weight adapted to oscillate therein, said center casing having a center weight adapted to oscillate therein, each of said end sections including an air chamber connected to an air pressure source and communicating with the outer end of its associated end casing to thereby urge the end weight therein to the inward end thereof, stop means for limiting inward movement of said end weights, said center casing having a left air pressure chamber at one end thereof and a right air pressure chamber at the other end thereof, said air pressure chambers communicating with said center casing, left and right manifold portions communicating with said left and right air pressure chambers, respectively, valve means connected to an air pressure source for selectively pressurizing one of said air pressure chambers and depressurizing the other of said air pressure chambers for moving said center weight to the desired end of said center casing, said valve means having a spool therein axially movable, means for actuating said spool, said valve having ports therein with openings connected to said manifold portions, said valve ports also having openings to the atmosphere, said spool when moved in one direction being operable to open certain openings in one of said ports to expose one of said ports, manifold portion, chamber and end of casing to atmospheric pressure and to close certain openings in the other of said ports to pressurize the other manifold portion, chamber and end of casing, stop means at both ends of said center casing for limiting outward movement of said center weight, said stop means being positioned so that when said end weights abut their inner stops said center weight will first strike one of said end weights before striking its stop means at that end of its travel.

5. A shock tester comprising two end sections connected to a center section, each of the end sections and said center section including aligned cylindrical open-ended end casings, each of said casings having wear resistant liners therein, said liners having oil paths therein communicating with the interior surfaces thereof, said liner oil paths being connected to a lubricating source, each of said liners having a weight adapted to oscillate therein, each of said end sections including an air chamber connected to an air pressure source and communicating with its associated casing to thereby urge the weight therein to the inward end thereof, stop means for limiting inward movement of the weights in the liners of said end casings, said center section casing having air pressure chambers at either end thereof, communicating with said center casing, switch means connected to an air pressure source for selectively pressurizing one of said air pressure chambers and depressurizing the other of said air pressure chambers for moving said center weight to the desired end of said center section casing, stop means at both ends of said center casing for limiting outward movement of said center weight, said stop means being positioned so that when said end weights abut their inner stops, said center weight will first strike one of said end weights before striking its stop means at that end of its travel.

6. A shock tester comprising at least one end section and a center section, said end section comprising an air chamber including an end plate adapted to abut the equipment to be shock tested, a cylindrical open ended casing in said chamber, an end weight in said casing adapted to move therein, said chamber having an air pressure source connected thereto, stop means to limit travel of said end weight away from said plate, said end weight normally being seated against said stop means due to air pressure in said chamber, said center section having a cylindrical casing mounted therein in alignment with said casing in said end section, a weight in said center section casing adapted to move therein and to strike said end weight when said end weight is seated against said stop means, said center section having an end air chamber at each end thereof in communication with the ends of said center section casing, valve means connecting said end air chambers to an air pressure source, said valve means being selectively operable to pressurize one of said end air chambers and to simultaneously open the other of said end air chambers to atmospheric pressure, and means for selectively retaining said center section weight near the end of said casing remote from said end section.

7. A shock tester comprising at least one end section and a center section, said end section comprising an air chamber including an end plate adapted to abut the equipment to be shock tested, a cylindrical casing having an open end in said chamber, an end weight in said casing adapted to move there in, said chamber having an air pressure source connected thereto, stop means to limit travel of said end weight away from said plate, said end weight normally being seated against said stop means due to air pressure in said chamber, said center section having a cylindrical casing mounted therein in alignment with said casing in said end section, a weight in said center casing adapted to move therein and to strike said end weight when said end weight is seated against said stop means, said center section having an air pressure chamber at each end thereof in communication with the ends of said center section casing, valve means connecting said air pressure chambers to an air pressure source, said valve means being selectively operable to pressurize one of said air pressure chambers and to simultaneously open the other of said air pressure chambers to atmospheric pressure, air exhaust means at the point of connection between said sections to prevent air compression between said weight as, said exhaust means being blocked by said end weight when seated against its stop means, and means for selectively retaining said center section weight near the end of said casing remote from said end section.

8. A shock tester comprising at least one end section and a center section, said end section comprising an air chamber including an end plate adapted to abut the equipment to be shock tested, a cylindrical open ended casing in said chamber, an end weight in said casing adapted to move therein, said chamber having an air pressure source connected thereto, stop means to limit travel of said end weight away from said plate, said end weight normally being seated against said stop means due to air pressure in said chamber, said center section having a cylindrical casing mounted therein in alignment with said casing in said end section, a weight in said center section casing adapted to move therein and to strike said end weight when said end weight is seated against said stop means, a stop means limiting travel of said center weight after said center weight has struck said end weight, said center section having an air pressure chamber at each end thereof in communication with the ends of said center section casing, valve means connecting said air pressure chambers to an air pressure source, said valve means being selectively operable to pressurize one of said air pressure chambers and to simultaneously open the other of said air pressure chambers to atmospheric pressure, said center weight remaining seated against its limit stop until moved therefrom by said end weight returning to its stop means due to air pressure thereagainst, and means for selectively retaining said center section weight near the end of said casing remote from said end section.

9. A shock tester comprising at least one end section and a center section, said end section comprising an air chamber including an end plate adapted to abut the equipment to be shock tested, a cylindrical casing with an open end in said chamber, an end weight in said casing adapted to move therein, said chamber having an air pressure source connected thereto to urge said end weight away from said plate, first stop means to limit travel of said end weight away from said plate, said end weight normally being seated against said stop means due to air pressure in said chamber, said center section having a cylindrical casing mounted therein in alignment with said casing in said end section, a weight in said center section casing adapted to move therein and to strike said end weight when said end weight is seated against said stop means, said center section having an air pressure chamber at each end thereof in communication with the ends of said center section casing, second stop means limiting travel of said center weight after said center weight has struck said end weight, valve means connecting said air pressure chambers to an air pressure source, said valve means being selectively operable to pressurize one of said air pressure chambers and to simultaneously open the other of said air pressure chambers to atmospheric pressure, said center weight when against said stop means closing said air chamber adjacent said second end section from pressurization through said valve means, and means for selectively retaining said center section weight near the end of said casing remote from said end section.

10. A shock tester comprising at least one end section and a center section, said end section comprising an air chamber including an end plate adapted to abut the equipment to be shock tested, a cylindrical casing with an open end in said chamber, an end weight in said casing adapted to move therein, said chamber having an air pressure source connected thereto, first stop means to limit travel of said end weight away from said plate, said end weight normally being seated against said stop means due to air pressure in said chamber, said center section having a cylindrical casing mounted therein in alignment with said casing in said end section, a weight in said center section casing adapted to move therein and to strike said end weight when said end weight is seated against said stop means, said center section having an air pressure chamber at each end thereof in communication with the ends of said center section casing, second stop means limiting travel of said center weight after said center weight has struck said end weight, valve means connecting said air pressure chambers to an air pressure source, said valve means being selectively operable to pressurize one of said air pressure chambers and to simultaneously open the other of said air pressure chambers to atmospheric pressure, said center weight when against said second stop means closing said air chamber adjacent said end section from pressurization through said valve means, said end weight upon return to said first stop means being operable to move said center weight from said second stop means to thereby reconnect the air path from said air chamber to the end of said center casing.

11. A shock tester comprising at least one end section and a center section, said end section comprising an air chamber connected to an air source, a cylindrical casing within said chamber, said air chamber having an end plate adapted to abut the equipment to be shock tested, said casing having a cover over one end thereof, said cover having a check valve therein, a flexible bladder of hydraulic fluid connected to said cover and positioned between said cover and said plate, a weight adapted to move within said casing, said check valve having small openings to permit fluid flow into said casing, said check valve opening in response to said weight moving toward said plate to permit fluid pressure engagement between said weight and said plate for the transmission of shock pulses to said equipment under test, said casing having a stop member at the other end thereof to limit movement of said weight in a direction away from said plate, said air source pressurizing said air chamber to compress said bladder until said fluid forces said weight to seat against said stop member in the absence of shock pulses applied to said weight, and means for applying shock pulses to said weight.

12. A shock tester comprising at least one end section and a center section, said end section comprising an air chamber connected to an air source, a cylindrical casing within said chamber, said air chamber having an end plate adapted to abut the equipment to be shock tested, said casing having a cover over one end thereof, said cover having a check valve therein, a flexible bladder of hydraulic fluid connected to said cover and positioned between said cover and said plate, a weight adapted to move within said casing, said check valve having small openings to permit fluid flow into said casing, said check valve opening in response to said weight moving toward said plate to permit fluid pressure engagement between said weight and said plate for the transmission of shock pulses to said equipment under test, said casing having a stop member at the other end thereof to limit movement of said weight in a direction away from said plate, said air source pressurizing said air chamber to compress said bladder until said fluid forces said weight to seat against said stop member in the absence of shock pulses applied to said weight, and means for applying shock pulses to said weight, said means comprising a cylindrical casing in said center section in alignment with said end section casing, said center section casing having a weight therein adapted to move therein to strike said end weight to apply a shock pulse thereto.

13. A shock tester comprising at least one end section and a center section, said end section comprising an air chamber connected to an air source, a cylindrical casing within said chamber, said air chamber having an end plate adapted to abut the equipment to be shock tested, said casing having a cover over one end thereof, said cover having a check valve therein, a flexible bladder of hydraulic fluid connected to said cover and positioned between said cover and said plate, a weight adapted to move within said casing, said check valve permitting rapid fluid flow in response to said weight moving toward said plate to permit fluid pressure engagment between said weight and said plate for the transmission of shock pulses to said equipment under test, said check valve permitting a less rapid fluid flow back into said casing, said casing having a stop member at the other end thereof to limit movement of said weight in a direction away from said plate, said air source pressurizing said air chamber to compress said bladder until said less rapid fluid flow forces said weight to seat against said stop member in the absence of shock pulses applied to said weight, and means for applying shock pulses to said weight.

14. A shock tester comprising at least one end section and a center section, said end section comprising an air chamber connected to an air source, a cylindrical casing within said chamber, said air chamber having an end plate adapted to abut the equipment to be shock tested, said casing having a cover over one end thereof, said cover having a check valve therein, a flexible bladder of hydraulic fluid connected to said cover and positioned between said cover and said plate, a weight adapted to move within said casing, said check valve permitting rapid fluid flow in response to said weight moving toward said plate to permit fluid pressure engagement between said weight and said plate for the transmission of shock pulses to said equipment under test, said check valve permitting a less rapid fluid flow back into said casing, said casing having a stop member at the other end thereof to limit movement of said weight in a direction away from said plate, said air source pressurizing said air chamber to compress said bladder until said less rapid fluid flow forces said weight to seat against said stop member in the absence of shock pulses applied to said weight, and means for applying shock pulses to said weight, said means comprising a cylindrical casing in said center section in alignment with said end section casing, said center section casing having a weight therein engageable with said end section weight and an air pressure chamber at each end of said center section, valve means connected to an air pressure source for selectively pressurizing one of said air pressure chambers and exposing the other of said air pressure chambers to atmospheric pressure to move said center section weight in a desired direction.

15. A shock tester comprising at least one end section and a center section, said end section comprising an air chamber connected to an air source, a cylindrical casing within said chamber, said air chamber having an end plate adapted to abut the equipment to be shock tested, said casing having a cover over one end thereof, said cover having a check valve therein, a flexible bladder of hydraulic fluid connected to said cover and positioned between said cover and said plate, a weight adapted to move within said casing, said check valve having small openings to permit fluid flow into said casing, said check valve opening in response to siad weight moving toward said plate to permit fluid pressure engagement between said weight and said plate for the transmission of shock pulses to said equipment under test, said casing having a stop member at the other end thereof to limit movement of said weight in a direction away from said plate, said air source pressurizing said air chamber to compress said bladder until said fluid forces said weight to seat against said stop member in the absence of shock pulses applied to said weight, and means for applying shock pulses to said weight, said means comprising a cylindrical casing in said center section in alignment with said end section casing, said center section casing having a weight therein engageable with said end section weight and an air pressure chamber at each end of said center section, valve means connected to an air pressure source for selectively pressurizing one of said air pressure chambers and exposing the other of said air pressure chambers to atmospheric pressure to move said center section weight in a desired direction.

References Cited in the file of this patent

UNITED STATES PATENTS

| | | |
|---|---|---|
| 804,449 | Boyer | Nov. 14, 1905 |
| 2,537,096 | Shreeve et al. | Jan. 6, 1951 |
| 2,810,288 | Herron et al. | Oct. 22, 1957 |
| 2,931,218 | Ottestad | Apr. 5, 1960 |